United States Patent [19]

Höfler

[11] Patent Number: 4,646,566
[45] Date of Patent: Mar. 3, 1987

[54] APPARATUS FOR TESTING GEAR WHEEL TOOTH FLANK PROFILE AND TOOTH FLANK LINES (TOOT ANGLE) AND A METHOD FOR POSITIONING THIS APPARATUS FOR THE MEASUREMENT APPARATUS

[76] Inventor: Willy Höfler, Erich-Heckel-Strasse 22, 7500 Karlsruhe 41, Fed. Rep. of Germany

[21] Appl. No.: 804,335

[22] Filed: Dec. 5, 1985

Related U.S. Application Data

[63] Continuation of Ser. No. 616,445, Jun. 1, 1984, abandoned.

[30] Foreign Application Priority Data

Jun. 10, 1983 [DE] Fed. Rep. of Germany ........ 3320983

[51] Int. Cl.⁴ .......................................... G01M 13/02
[52] U.S. Cl. ................................ 73/162; 33/179.5 R
[58] Field of Search .................. 73/162; 333/179.5 R, 333/169 R, 172 E, 556, 558, 559, 561

[56] References Cited

U.S. PATENT DOCUMENTS

| | | | |
|---|---|---|---|
| 2,992,491 | 7/1961 | Hofler | 33/179.5 |
| 3,945,124 | 3/1976 | Jacoby et al. | 33/179.5 |
| 4,276,699 | 7/1981 | Sterki et al. | 33/179.5 |
| 4,322,889 | 4/1982 | Guenter | 33/172 E |
| 4,356,556 | 10/1982 | Sterki | 33/179.5 |

FOREIGN PATENT DOCUMENTS

| | | |
|---|---|---|
| 2934347 | 11/1980 | Fed. Rep. of Germany. |
| 2952497 | 2/1981 | Fed. Rep. of Germany. |
| 3134246 | 3/1983 | Fed. Rep. of Germany ..... 33/179.5 R |
| 3125693 | 11/1983 | Fed. Rep. of Germany. |

Primary Examiner—Charles Frankfort
Assistant Examiner—Patrick R. Scanlon
Attorney, Agent, or Firm—Edwin E. Greigg

[57] ABSTRACT

A transportable apparatus for testing the tooth flank profile and tooth flank lines (tooth angle) of gear wheels, in particular gear wheels of large diameter. With this apparatus, prior to the measuring operation, the positioning of the apparatus at the gear wheel to be tested can be carried out simultaneously with the aid of an orientation scanner, and the selection of the tooth gaps least associated with error is simultaneously effected by moving the orientation sensor into various tooth gaps in preparation for the measuring operation and with the aid of a computer ascertaining the measured-value deviations from one another of the various tooth gaps that are entered.

11 Claims, 10 Drawing Figures

APPARATUS FOR TESTING GEAR WHEEL TOOTH FLANK PROFILE AND TOOTH FLANK LINES (TOOT ANGLE) AND A METHOD FOR POSITIONING THIS APPARATUS FOR THE MEASUREMENT APPARATUS

This is a continuation of copending application Ser. No. 616,445 filed June 1, 1984 now abandoned.

BACKGROUND OF THE INVENTION

The invention relates to a transportable apparatus for testing the tooth flank profile and the tooth flank lines (tooth angle) of gear wheels, in particular gear wheels of large diameter, or gear machines or tooth flank grinding machines as well as a method for positioning this apparatus and for orienting the measuring scanner at the gear teeth for the measuring operation. The apparatus includes a frame which can be leveled from the machine carriage or the workpiece table by adjusting means and can be aligned at a correct angle with respect to the gear teeth of the test object. On a first carriage movable at a tangent to the gear wheel, the apparatus frame carries a motor-driven second carriage which is movable toward and away from the gear wheel at right angles to the first carriage, and a spherical measuring scanner is movable by the second carriage for performing testing on a stationary or arrested gear wheel. The apparatus further has an orientation sensor which can be moved into various tooth gaps and has a ball at its end, corresponding to the gear wheel modulus, for ascertaining the apparatus position by means of a computer connected to the apparatus. The tangential and radial position of the orientation sensor can be transmitted to this computer via incremental travel transducers effective in travel directions, or the movement of the measuring scanner is controllable by this computer via the travel transducers.

In testing gear wheels of large diameter, transportable testing apparatuses are preferably used so that the gear wheel can be tested directly in the gear making machine and does not have to be moved to the test apparatus and secured there. Transportable testing apparatuses also have the advantage that the gear wheels can be tested on side, that is, when they are installed for use in a machine. With transportable testing apparatuses of this kind, one main probolem is that the apparatus has to be put into a definite reference position relative to the gear wheel to be tested. For it is only when the position of the apparatus relative to the gear wheel is known exactly that the scanning of the tooth flanks can provide conclusive data on any possible gearing errors and their magnitude.

The prior art already encompasses various proposals for aligning the testing apparatus with respect to the gear wheel to be tested and ascertaining its position. From German Offenlegungsschrift 29 52 497, a method and an apparatus are known in which the test apparatus is first aligned relative to the gear wheel to be tested such that the plane of adjustment of the orientation sensor is at right angles to the axis of the gear wheel. Then the orientation sensor is moved into a tooth gap until it rests on both adjacent tooth flanks of this tooth gap. The gear wheel is then rotated about its axis, carrying the orientation sensor along with it, and the displacement of the orientation sensor thereby occurring is measured; from these measurements the position of the orientation sensor or of the test apparatus relative to the gear wheel is calculated. The rotation of the gear wheel is effected such that the orientation sensor is first displaced toward the test apparatus until the tooth gap containing the sensor has attained its culmination point relative to the testing apparatus, at which the orientation sensor moves back away from the testing apparatus. This turnaround point is measured, and from it, in combination with the also-measured initial position of the orientation sensor at the beginning of the rotational movement, the position of the test apparatus relative to the gear wheel can be calculated. The coordinates are thus obtained for some selected point of the test apparatus, for instance its measuring sensor relative to a coordinate system that begins at the gear wheel axis and extends at right angles thereto.

The reversal of movement at the turnaround point of the orientation sensor can be measured only with difficulty, however. In a gear wheel two meters (m) in diameter, for instance, the wheel must be rotated by about three millimeters (mm) at its circumference before a difference in height of one micron (nm) becomes perceptible. In other words the test apparatus will be positioned incorrectly within this 3 mm, which represents an incorrect oblique position of the profile curve, which in turn simulates a pitch circle error of the profile curve; thus this apparatus can be used for positional testing only for gears of low quality.

The same problems underlie the subject of German Offenlegungsschrift 29 34 347. There, two supporting means are used which are disposed parallel to one another and are moved simultaneously into two gaps of the gear wheel to be tested. This alignment of the test apparatus is affected in the same manner as that mentioned above by possible inherent errors in the teeth and is subject to the same fundamental inaccuracies.

Finally, a method and an apparatus are known from German Offenlegungsschrift 31 25 693, which for positioning purposes uses a pivotable lever having a precision measuring ball as well as angle and length measuring systems, and furthermore for the actual testing uses a separate compound carriage having two incremental measuring systems for the X and Y directions of movement.

The disadvantage here is the positioning of the apparatus with the angle measuring system and the pivot arm, which is up to approximately 400 mm long, so that the apparatus can also be positioned on a wide base with respect to the gear wheel. The wider the base is, that is, the greater the possible pivoting angle is, the more accurate is the positioning with respect to the test object gear teeth.

The most accurate angle measuring system has an accuracy of only ±1.5", which given a radius of 200 mm corresponds to a measurement inaccuracy of ±1.5 μm; and at a radius of 400 mm, which corresponds to the length of the pivoting arm, this represents an inaccuracy of ±1 μm. This inaccuracy of the angle measuring system is correspondingly disadvantageous for the positioning of the apparatus.

This known apparatus is furthermore very expensive, because a compound carriage is additionally required for measuring the profile and tooth flank line deviations. The substantial structural size and the great weight of this known transportable apparatus are also due to this additional compound carriage.

OBJECT AND SUMMARY OF THE INVENTION

It is an object of the present invention to improve the accuracy of a gear tooth measuring apparatus generally defined above, which is an improvement over German Offenlegungsschrift 31 25 693

A further object is to provide an apparatus at a more favorable cost and at minimal size, so that it is transportable and easy to use on site.

The above objects are attained by use of an apparatus made in accordance with the invention in which a third carriage is supported on the second carriage which is displaceable parallel to the second carriage counter to a spring force acting toward the test object. The third carriage operates relative to the first carriage with the travel transducer for the radial position, that the third carriage carries the orientation sensor during the ascertainment of the apparatus position, and that after this ascertainment the orientation sensor can be exchanged for the measuring scanner with the center point of the ball being maintained.

These provisions according to the invention have the effect that the measuring apparatus makes do with only two incremental longitudinal travel transducers; that is, only one compound carriage having incremental travel measuring systems effective in the X and Y directions is required for both the orientation operation and the measuring operation. Hence a highly accurate and expensive rotational-value transducer is no longer needed. On the other hand, the possibility now exists, by moving the orientation sensor into various tooth gaps one after another, of statistically seeking out the particular tooth gap which deviates least from the value calculated as coming closest to the gear teeth geometry. The linear measurement transducer systems, which are now all that are required, are substantially more accurate than a rotational-value transducer, and an accurate positioning of the measuring apparatus now becomes possible. Furthermore a machine-integrated measuring system is hereby created which enables the use of all the carriages available on the manufacturing machine. The measuring apparatus according to the invention is thus very small and structurally simple in embodiment, so that particularly with a view to its transportability, it is lightweight and easy to manipulate.

The invention will be better understood and its mode of operation will become more apparent from the ensuing detailed description of preferred embodiments taken in conjunction with the drawings.

DESCRIPTION OF THE PREFERRED EMBODIMENTS

Before the invention is described in detail, various symbols and concepts used in gear manufacturing will be listed and explained so that they can be used in the ensuing description.

Presuming an error-free gear wheel, the following symbols have the following meanings in terms of the geometry of the gear teeth:

$\tau$: the pitch angle of the gear wheel;

$\epsilon$: the angular deviation of the measuring apparatus relative to the axis of rotation of the gear wheel or to the center of the machine table;

$M_{rK}$: radial single-ball dimension;

$D_M$: diameter of the scanning ball of the orientation sensor, which corresponds exactly to the modulus of the gear wheel to be tested, in such a manner that if the tooth gap is error-free the orientation ball on the pitch circle of the gear wheel rests on the adjacent flanks of one tooth gap;

$d_K$: diameter of the scanning ball center point circle relative to the rotational point of the gear wheel to be tested;

$\Delta K$: the difference between two measuring positions of the orientation sensor in the Y direction, or in other words radially relative to the test object;

$Y_T$: relative position of the orientation sensor, or the scanner ball, with respect to the center of the gear wheel to be tested; and $X_T$: relative position of the orientation sensor or of the ball of the measuring scanner, with respect to the center of the machine table, or to the axis of rotation of the gear wheel to be tested.

Figure 1:
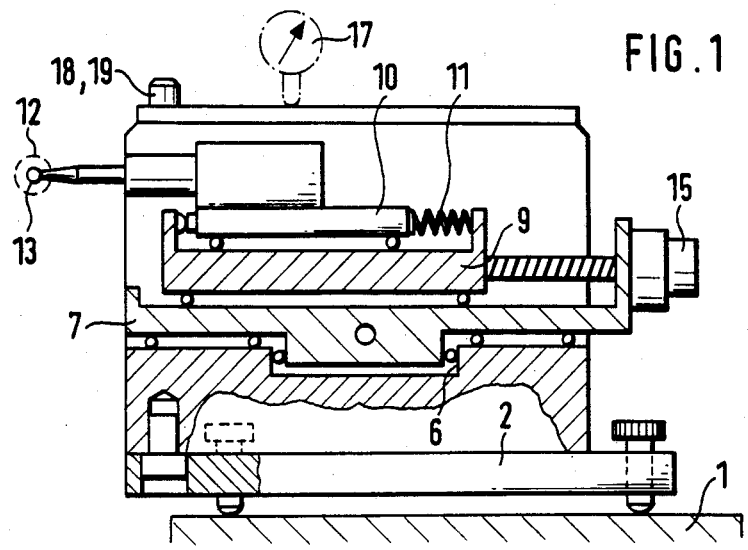
FIGS. 1 and 2 are fragmentary sectional views showing the basic structure of the apparatus according to the invention, seen in a side view and a plan view, respectively.
Figure 2:
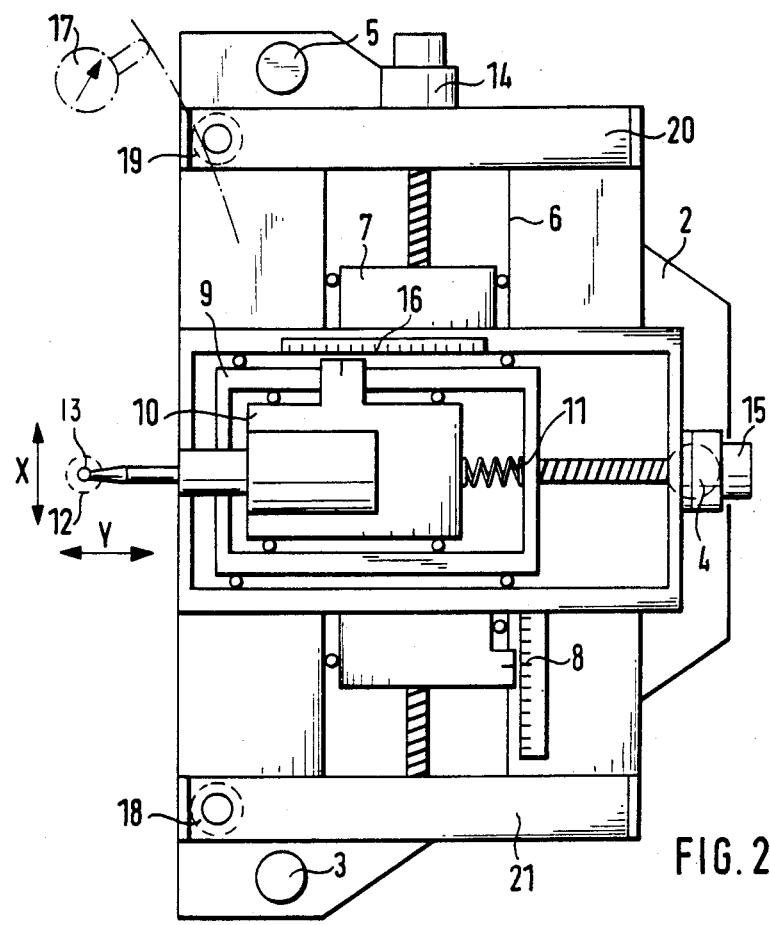

As shown in FIGS. 1 and 2, the transportable measuring apparatus is mounted on the workpiece table 1 of a gear wheel processing machine, on which it rests with the apparatus housing 2 via three adjusting screws 3, 4, 5 for leveling the apparatus. Located on the apparatus frame 2 is a guide track 6 in the X direction, that is, at a tangent to the test object, and a first carriage 7 is displaceable in this track 6 in a known manner via ball roller guides positioned between the frame 2 and the first carriage. The displacement movement or displaced position of this first carriage relative to the apparatus frame is detectable via an incremental longitudinal travel transducer 8 which measurement can be picked up and processed by a computer, not shown.

A second carriage 9 is displaceable on the carriage 7 via ball roller guides in the direction toward and away from a gear wheel to be checked, or in other words in the Y direction. This second carriage supports a third carriage 10, which is movable on ball roller guides and, which is held relative to the second carriage by the force of a spring 11 with the direction of force toward the gear wheel to be tested. An orientation sensor 12 or measuring scanner 13 is secured to the third carriage on its side oriented toward the gear wheel. In the example shown in FIGS. 1 and 2, the carriage 7 is movable and adjustable by a control motor 14 which rotates a rotatable threaded shaft that engages a fixed threaded element secured to the carriage 7. The carriage 9 is movable and adjustable by means of a control motor 15 by a rotatable threaded shaft and fixed element as for carriage 7. Between the carriage 10 and the carriage 7, there is an incremental longitudinal travel transducer 16 for detecting the position in the Y direction, that is, in the direction toward and away from the gear wheel.

For arranging the measuring apparatus on the machine table 1, the apparatus is first placed upon the machine table 1. For levelling the measuring apparatus, the apparatus has two reference faces 20, 21, by way of which, with the aid of a measuring device attached by magnetic adhesion to the gear wheel, the levelling of the measuring apparatus is effected, when the measuring device displays the same information for both reference faces 20, 21. For example, in order to level the apparatus, the adjusting screws 3, 4 may be rotated in either direction which raises or lowers the table 1.

Then the measuring device 17 is again secured by magnetic adhesion on the gear wheel to be tested, in such a way that upon rotating the gear wheel to be tested along with the measuring device 17, the scanner of the measuring device can be made to cooperate with the bolts 18, 19 of the measuring apparatus frame, these bolts are aligned on a line exactly parallel to the track 6 of the X direction. In this way a centered positioning of the measurement apparatus at a tangent to the gear wheel to be tested can be attained, if the values displayed on the measuring device 17 are the same for both bolts 18, 19.

Figure 3:
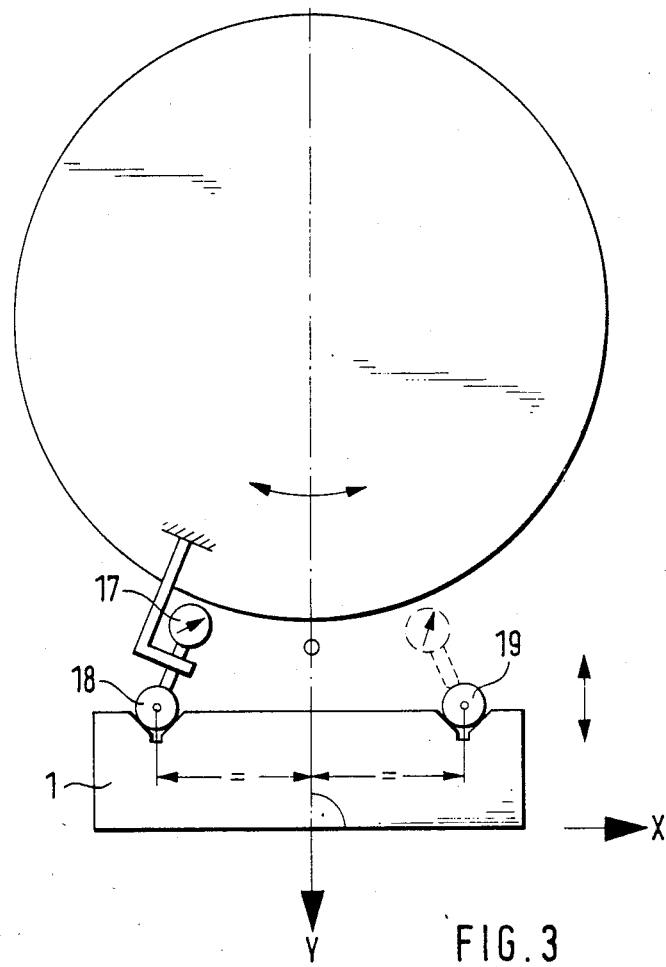
FIG. 3 shows the processof arranging the apparatus on the work table at a tangent to the test object.

FIG. 3 again, in simplified form, shows the arrangement of the measuring apparatus at a tangent to the test object. Here the measuring device 17 is firmly attached to the test object by magnetic adhesion and is moved along the bolts 18, 19. If the measuring device 17 shows the same dis;play for both, then the apparatus frame 2 is aligned centrally at a tangent to the test object.

The operations described above are known and are repeated in summary form here only for the sake of completeness.

Once the measuring apparatus is levelled and aligned at a tangent with respect to the gear wheel to be tested, the next step is to perform the positioning of the measuring sensor, with respect to the test object for the flanks of the tooth gap to be measured. To this end, it is furthermore necessary to align the center point of the ball of the orientation sensor, and accordingly the center point of the ball of the measuring scanner later on, accurately with respect to the axis of rotation of the test object or of the work table of the gear wheel processing machine.

This is accomplished, in a manner known and hence not described in detail herein, with the aid of a gauge disposed at the center of rotation of the gear wheel or with the aid of an aligning device. The result is that the measuring apparatus is in a position such as that shown in in more detail in FIG. 4. Using the reference numerals from FIGS. 1 and 2, FIG. 4 again shows the apparatus frame 2 with the first carriage 7, the second carriage 9 and the third carriage 10, as well as the length measuring rules 8 and 16. The control motor 14(X) for the movement of the carriage 7 in the X direction and the control motor 15(Y) for the movement of the carriage 9 in the Y direction, and thus of the carriage 10 under the influence of the spring force of the spring 11, are shown as well.

Figure 4:
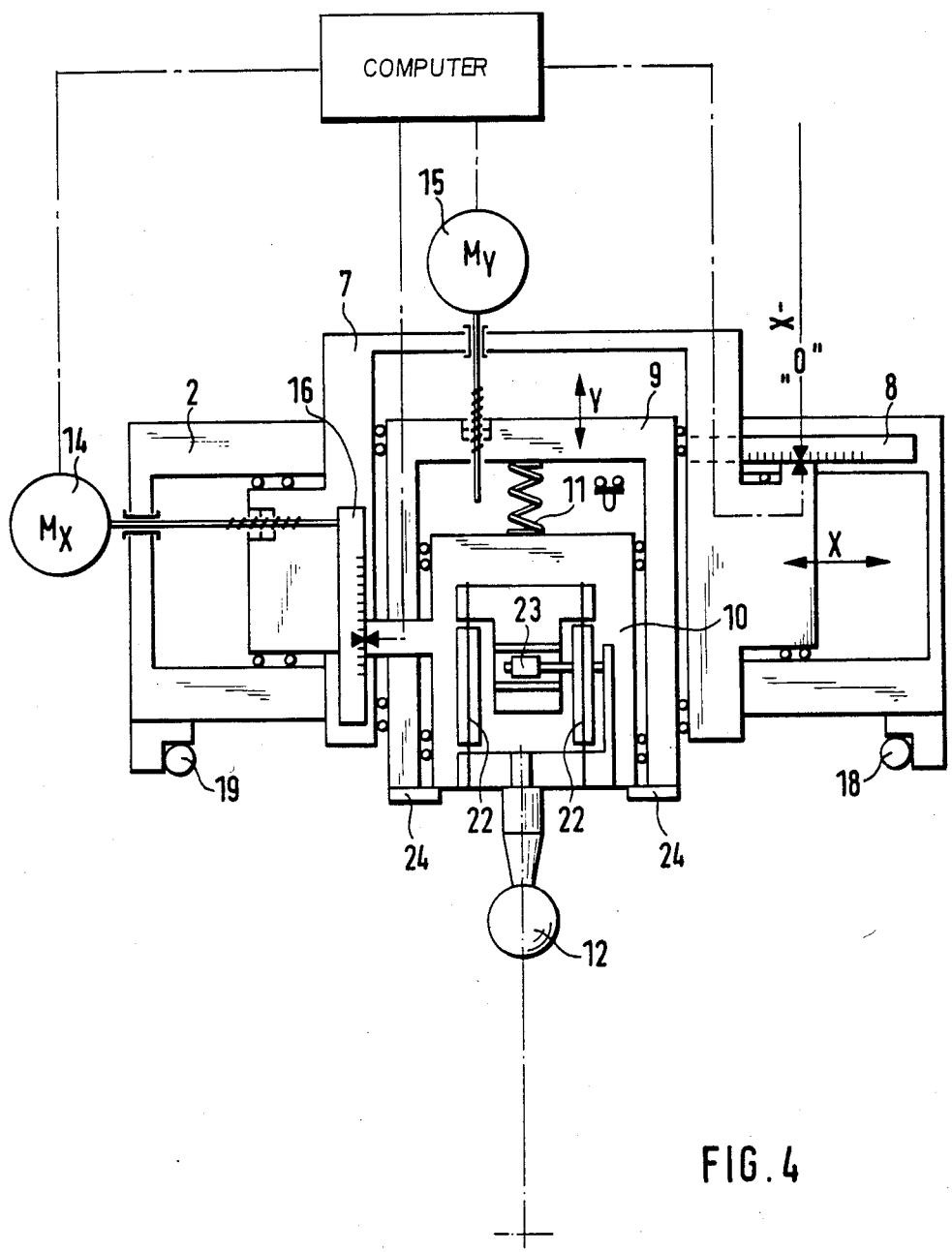
FIG. 4 is a detailed plan view of an apparatus according to the invention, relating to the process of arranging the apparatus on the work table with respect to the test object.

Going into further detail, FIG. 4 also shows that the orientation sensor 12 on the carriage 10 is supported such that via a spring package 22 the carriage is displaceable at a tangent to the gear wheel to be tested. A measured-value transducer 23, for instance in the form of an inductive transducer, is connected with the spring package 22.

As shown in FIG. 4, the measuring apparatus has been fully levelling as described above, and the orientation sensor is aligned with respect to the center of rotation of the gear wheel or gear wheel processing machine. In this position, the length transducers 8, 16 and the measured-value transducer 23 are balanced to zero at the accompanying computer.

It should also be noted with respect to FIG. 4 that at first the carriage 10 on the carriage 9 is located resting on stops 24 pointing toward the test object, under the force of the spring 11.

Figure 5:
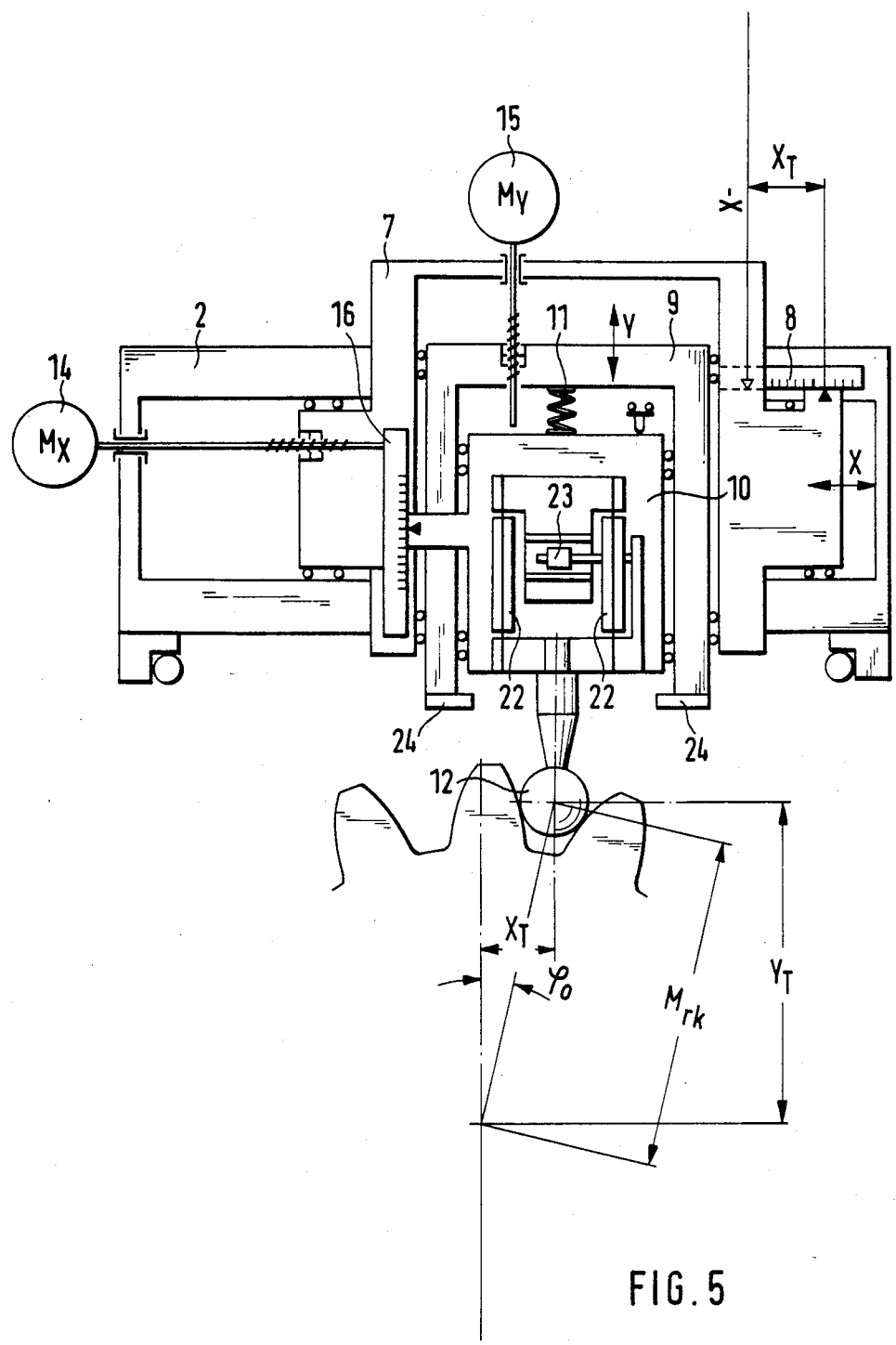
FIG. 5 shows the apparatus according to FIG. 4 with respect to its orientation to the test object.

FIG. 5 now shows how orientation with respect to the gear wheel to be measured is accomplished.

To this end, the ball 12 of the orientation sensor is moved into a tooth gap by actuating the control motors 14, 15, whereupon the carriage 10 is raised from the stops 24, as soon as the orientation ball 12 comes to rest against the flanks of the tooth gap it has entered. In this process the inevitable crosswise displacement of the orientation sensor is initially absorbed by the spring package 22. Via the control motor 14(X), the carriage is guided in followup movement until such time as the zero position described is regained at the measured-value transducer 23. As a result, the value $X_T$ can be ascertained with the aid of the length-measuring transducer 8. The process of orienting and positioning is thus completed for this tooth gap, and with the values $X_T$ and the radial single-ball dimension $M_{rK}$, the zero-point angle $\phi_o$ can be ascertained, in accordance with the equation $$\phi_o = \arc \sin X_T/M_{rK}.$$

Now in order to keep the influence of production-induced tooth gap deviations on the accuracy of positioning of the apparatus as low as possible, the orientation scanner is moved into a plurality of tooth gaps. In other words, the positioning process described above is repeated for a plurality of adjacent tooth gaps. The result, in cooperation with the computer connected to the measuring apparatus and the values stored in it for an error-free gear wheel, is a number of angles $\phi_o$, which makes it possible to select from among them, for the intended tooth-flank testing, that angle $\phi_o$ which statistically deviates the least from the probably correct dimension. For example, on the basis of a first orientation process, deviations in the X direction of $+8$ µm, $+2$ µm, and $-3$ µm may be ascertained in subsequent tooth gaps entered by the orientation scanner, based on the initially ascertained value $X_T$ and taking into account the geometry, which of course is known, of the gear wheel to be tested. Thus for the actual measuring operation it is possible to use the tooth gap for which the deviation, in this instance, of $+2$ µm has been found. Additionally, the value $Y_T$ is then defined as well, in accordance with the formula $$Y_T = \sqrt{M_{rK}^2 - X_T^2}$$

The tooth gap that is to be subjected to testing is selected on this basis, and the positioning scanner 12 is now exchanged for the measuring scanner which is to be used for the actual testing; the center of the measuring balls in both cases, and thus the actual position in terms of the measuring apparatus, is maintained when this exchange is made.

Figure 6:
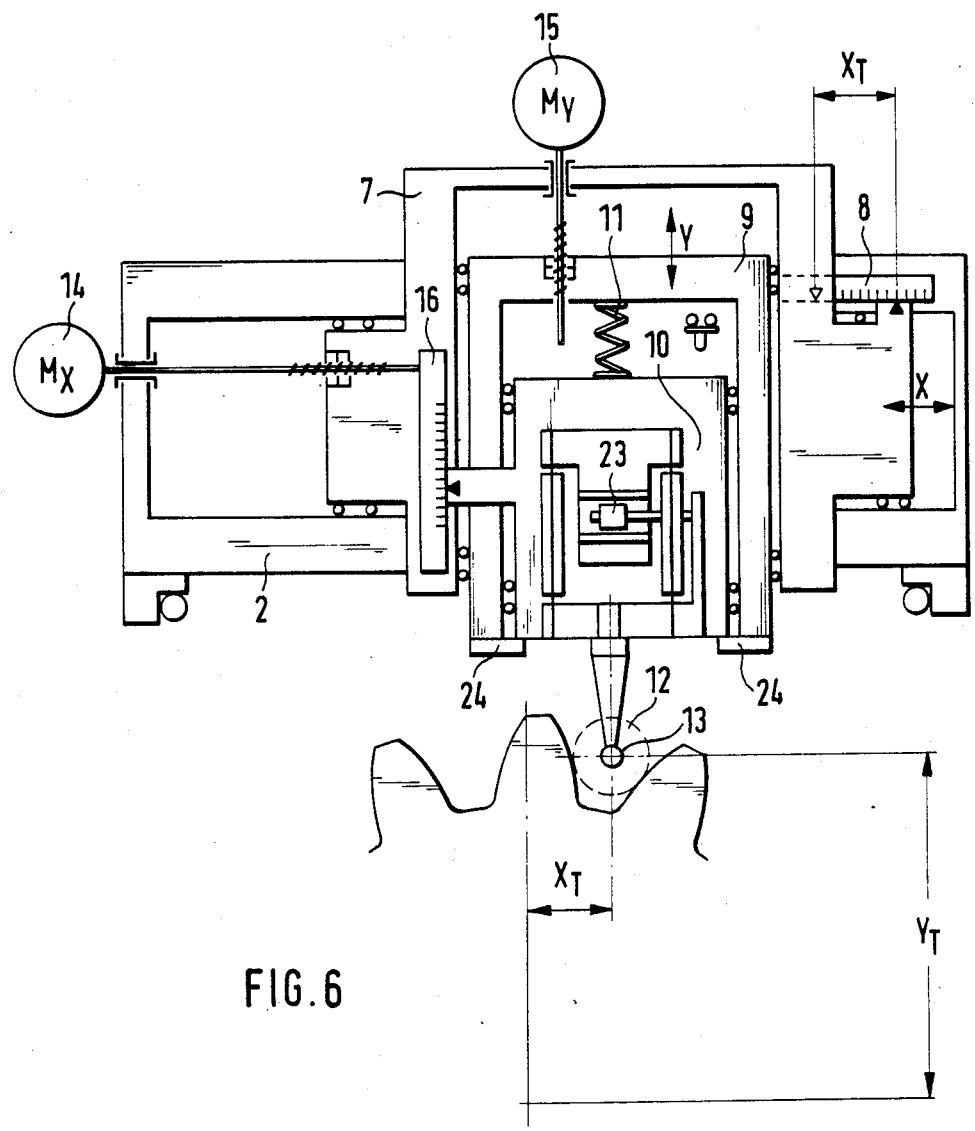
FIG. 6 shows the apparatus according to FIGS. 4 and 5 which has been readied for testing the tooth flanks of the gear wheel.

Once this has been done, as shown in FIG. 6, then based on the measurement position in the tooth gap which has the statistically smallest deviation of the tooth gaps entered by the orientation sensor, the testing of tooth flanks at one or both sides of the thus-selected tooth gap is performed, with the aid of the measuring scanner which has now replaced the orientation sensor. To this end, the measuring scanner is positioned with its center point on the center point, which of course has been defined by computer, of the orientation sensor that was used initially. From there, and taking into account the geometry of the teeth as stored in the computer, a given tooth flank is approached at either the top or base of the tooth. Subsequently, by means of incremental control by means of the control motors 14, 15, the measuring sensor moves along the tooth flank to be tested in accordance with the set-point shape of the flank stored in memory in the computer, in the course of which deviations from this set-point shape, or in other words actual values for the tooth flank actually scanned, are emitted via the measured-value transducer 23.

If a testing of tooth flank lines is desired, this is accomplished at right angles to the plane of the drawing in FIG. 6, along the tooth flank, beginning with the above-described positioning of the measuring scanner and in comparison with the shape of the course of the tooth flank as stored in the computer. This is all known and does not need to be described in detail.

Figure 7:
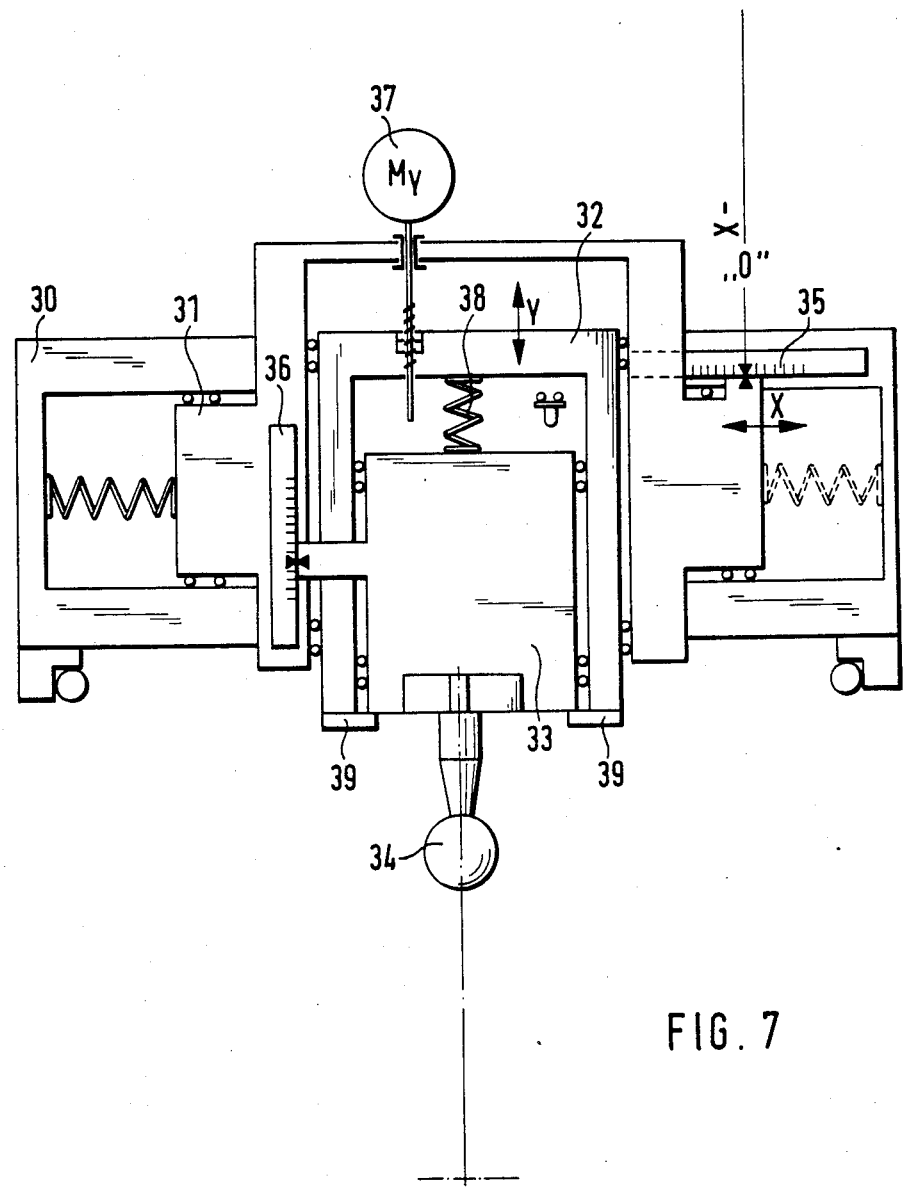
FIG. 7 shows a modification of the apparatus according to FIGS. 1 and 2 during the process of arranging it on the work table.
Figure 8:
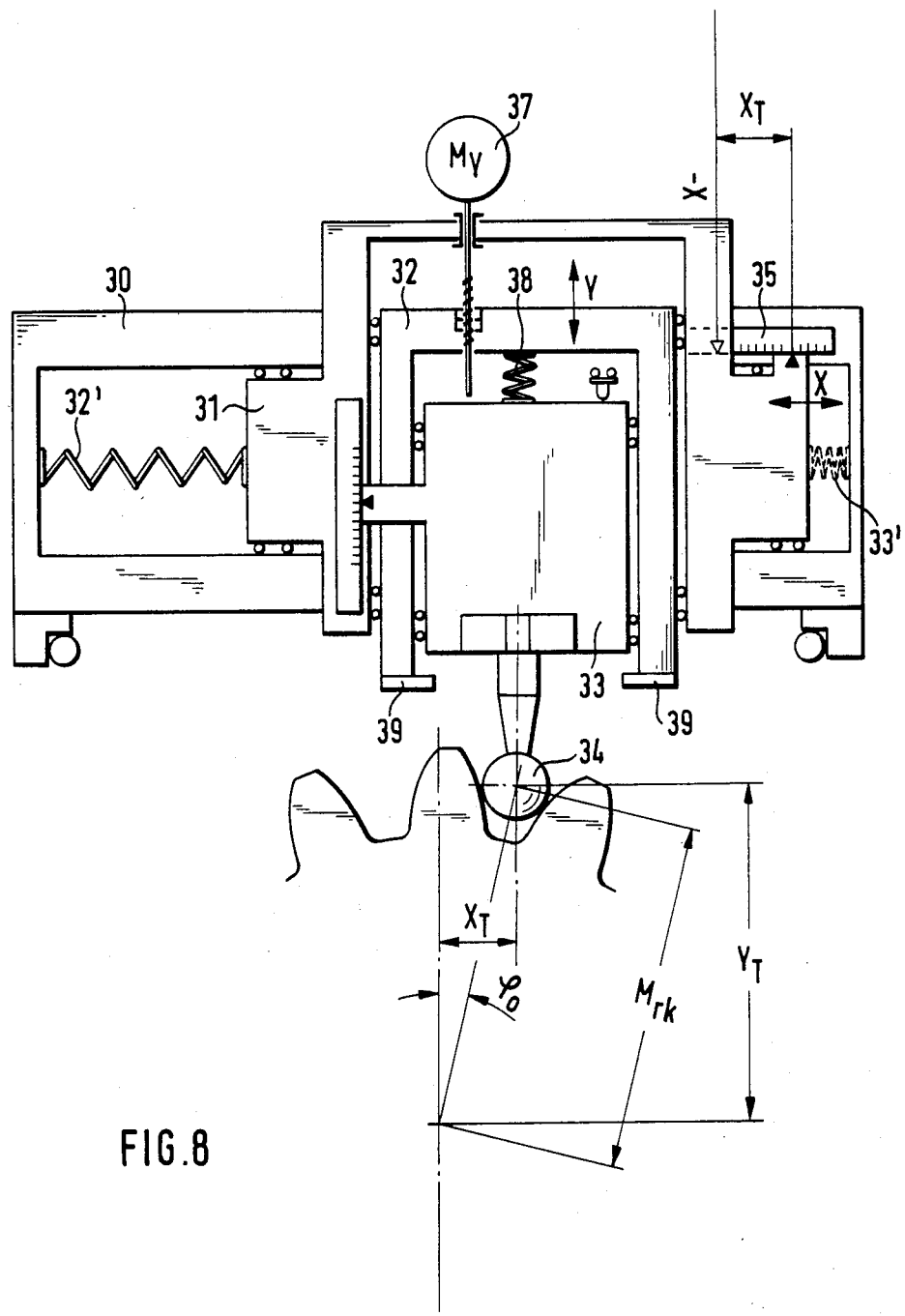
FIG. 8 shows the apparatus of FIG. 7 during the process of its orientation with respect to the test object.
Figure 9:
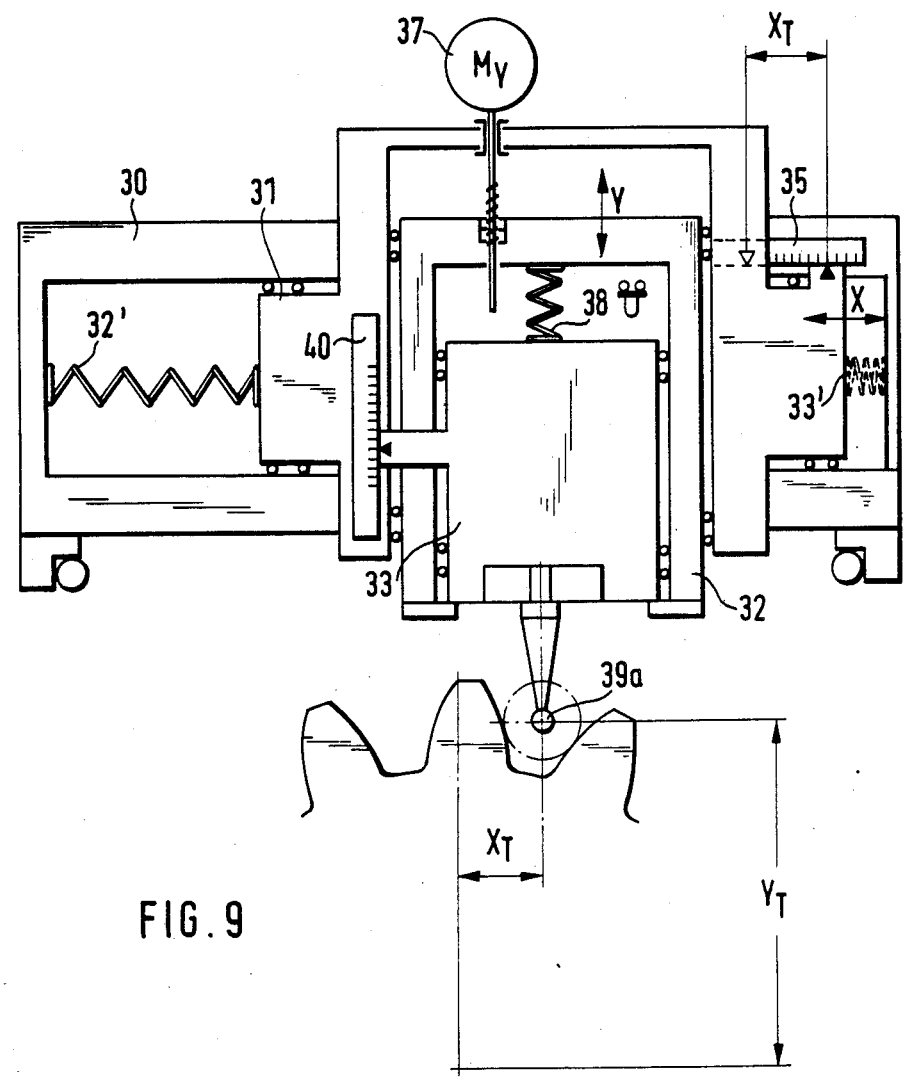
FIG. 9 shows the apparatus of FIGS. 7 and 8 in the initial position for the testing operation.

FIGS. 7-9 show a modified form of embodiment of the measuring apparatus. Here a carriage 31 is displaceable on the apparatus frame 30 at a tangent to the test object, that is, in the X direction, in the manner described, and a second carriage 32 is displaceably guided on the carriage 31 in a manner such that it is directed toward the test object or in other words moves in the Y direction. The second carriage 32, in turn, supports a third carriage 33 such that it is parallel to the second carriage. The carriage 33 carries the orientation sensor 34 with its ball on the end corresponding to the modulus of the gear wheel. The carriage 31 can be oriented with respect to the apparatus frame via an incremental length transducer 35; that is, its position is ascertainable and transmittable to the computer by means of this length transducer 35, while the position of the third carriage 33 with respect to the first carriage 31 is detectable for the computer via the incremental length transducer 36. The second carriage 32 is movable toward and away from the gear wheel with the aid of a control motor 37. The third carriage 33 is located resting on stops 39 of the second carriage 32, being subjected to the force of a spring 38.

FIG. 7 shows the status of the measuring apparatus after it has been levelled and the orientation sensor 34 has been positioned with respect to the center of rotation of the gear wheel, as has been described above in conjunction with FIGS. 1-4.

Now, as shown in FIG. 8, a tooth gap is approached with the orientation sensor 34. The carriage 31 is moved by hand in the X dirrection into the appropriate position, and the carriage 32 is moved, with the aid of the control motor 37 in the direction toward the gear wheel to be tested, until such time as the carriage 33 is raised from the stops 39 and the ball of the orientation sensor 34 thus, under the force of the spring 38, is located resting on both flanks of the tooth gap it has approached. In this position, from the values $X_T$ and the theoretically correct radial single-ball dimension $M_{rK}$, the angle $\phi_o$ is again arrived at as the positioning for a possible later measuring operation. After this positioning process, adjacent tooth gaps are likewise approached in the manner described above, and the angle $\phi_o$ there is ascertained, so as to arrive at the most favorable angle $\phi_o$, that is, the tooth gap that is associated with the least error, for the final measuring operation.

Once this tooth gap has been ascertained, then the orientation sensor 34 is moved into it, whereupon the carriage 31 is clamped into position relative to the apparatus frame 30. Now by simply retracting the carriage 32, 33 with the aid of the control motor 37 and then replacing the orientation sensor 34 with the measuring scanner 39a as shown in FIG. 9, the positioning of the measuring scanner 39a at the outset position for the flank measurement can be accomplished with the aid of the incremental length travel transducer 40 which is effective in the Y direction. As soon as this outset position is attained, the carriage 31 is unlocked relative to the apparatus frame 30, and by the imposition of one of the springs 42, 43 acting on the carriage 31, a contact of the measuring scanner 39a oriented toward the tooth flank to be tested is effected. This tooth flank is then scanned incrementally by the measuring scanner 39a under the influence of the spring force 32 or 33, with the aid of the incremental travel transducer 40; the measured values that result are compared via the length transducer 34 with the theoretically correct measurement values stored in memory in the computer and any deviations are emitted as errors.

What is common to the apparatuses described above is therefore the following: After levelling and arrangement of the measuring apparatus in terms of a first tooth gap with the aid of the orientation sensor, a position for the measuring scanner later to be used is ascertained and to this end the coordinates in the directions at a tangent to and radial to the test object are fixed in the computer. Subsequently, by approaching further tooth gaps, further measured positions at other tooth gaps are ascertained with the aid of the orientation sensor, taking into account the geometry of the gear wheel to be tested. From these various measuring positions that are ascertained, the one that is statistically most favorable—that is, the measuring position that is associated with the least error—is selected. After the orientation sensor is replaced by the measuring scanner, the measuring scanner is moved into this measuring position. Beginning at this position, the measuring scanner is guided along the error-free shape, stored in the computer, of the flank to be tested and the deviation between the measuring scanner position and this error-free shape is picked up and emitted by the computer. This is accomplished in a known manner by moving the measuring scanner in the X and Y directions; in the case of FIGS. 4-6, both these movements are motor-controlled, while in the case of FIG. 7 only the Y direction is controlled in increments, while the X direction is the result of the action of the springs 42, 43.

It is common to both illustrated forms of embodiment that the movability of the third carriage 10 or 33 relative to the second carriage 9 or 32, as effected by the spring force of the spring 11 or 38, serves to moe the positioning sensor into contact against the tooth flanks of the tooth gap that has been approached. Once the positioning sensor is replaced by the measuring sensor, the starting position for the measuring operation is approached with the contact of the carriage 10 or 33 against the stops 24 or 39, which in terms of the positioning of the third carriage makes no difference with respect to the incremental length transducers 16 or 40.

The apparatus according to the invention and as described in conjunction with FIGS. 1-9 thus also enables the position of the ball of the orientation sensor with respect to the axis of rotation of the test object (i.e., the center of the machine table) to be ascertained with the aid of the computer connected with it, so that a positioning of the ball of the orientation sensor with respect to the center of the machine table with the aid of a standard gauge or aligning device does not have to be performed. This will be described below, referring to FIG. 10.

For the computer-supported positional determination of the ball of the orientation sensor with respect to the axis of rotation of the gear wheel, the ball 12 or 34 is moved into two tooth gaps 45, 46 of the test object by way of example. At the incremental length transducer 8 or 35, the travel length X (from X' to X") is measured and with the incremental length transducer 16 or 36 for the Y travel, the depth $\Delta K$ to which the ball has entered the tooth gap is also picked up; $\Delta K$ corresponds to the difference between the two measuring positions in the tooth gaps 45 and 46. The measuring operation is thus completed, and the travel distance X and the dimension $\Delta K$ have been measured. The computer-supported positional determination of the measuring ball of the orientation scanner with respect to the center of gear wheel rotation is now effected. Based on the values for the geometry of the gear teeth given initially above, the radial single-ball dimension $M_{rK}$ is calculated as:

$$M_{rK} = \tfrac{1}{2} \cdot (d_K + D_M)$$

$$d_K = d \cdot \frac{\cos \alpha t}{\cos \alpha K_t} = \frac{d_b}{\cos \alpha K_t}$$

where
 $\alpha_t$ = the end-face engagement angle;
 $\alpha K_t$ = the profile angle with end-face intersection of the circle by the center point of the ball;
 $d_b$ = the diameter of the basic circle.

The angular deviations with respect to the axis of rotation of the gear wheel or to the center of the machine table $\epsilon$ are calculated as follows:

$$\epsilon = \text{arc tang} \frac{\Delta K}{X}$$

The dimension $$Y_{Tn} = \sqrt{M_{rK}^2 - X_{Tn}^2}$$

or $$Y_{Tn} = \cos \tau \pm \epsilon \cdot M_{rK}$$

The starting angle $\phi_o$ for the coordinate-wise scanning and testing of the profile is:

$$\phi_o = \tau \pm \epsilon$$

or $$\phi_o = \text{arc sin } X_T/M_{rK}$$

The apparatus described is naturally also suitable for testing the flank line shape, to which end the measuring scanner is additionally displaceable in a known manner in the direction perpendicular to the measuring apparatus frame or at right angles to what is shown in FIGS. 2, 4-10, in addition to the cooresponding execution of incremental movements in the X and Y directions. The values ascertained in this scanning operation are compared with the theoretically correct values stored in the computer. Deviations are detected as measured values with the aid of the transducer 23 or of the incremental measuring rule 35. Here again, the testing is performed with the gear wheel rotation arrested.

Figure 10:
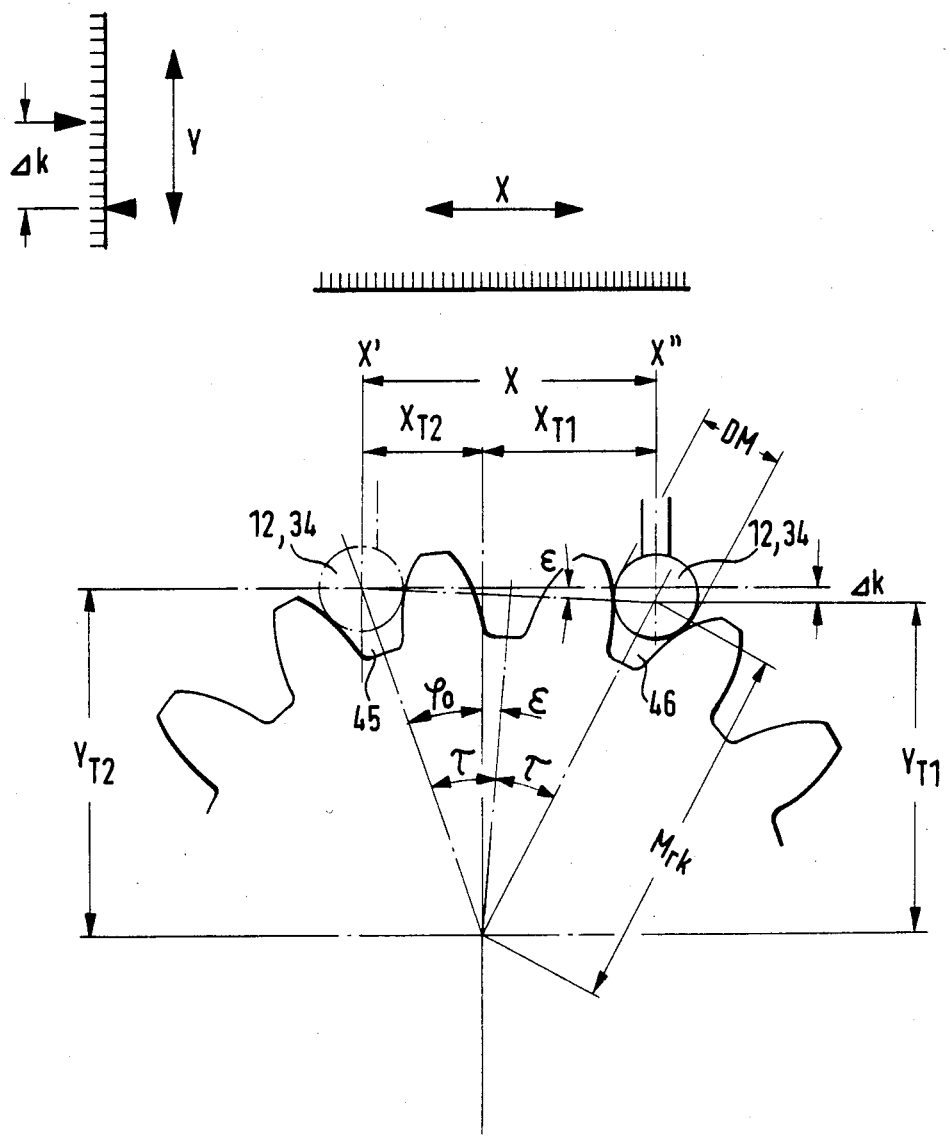
FIG. 10 is a schematic illustration for a simpler alignment of the orientation sensor with respect to the center of rotation of the test object.

It should also be noted that in the description of the computerized ascertainment explained in conjunction with FIG. 10, the terms $X_{Tn}$ and $Y_{Tn}$ have been generalized. The appropriate numerals 1 or 2 should be substituted for the term n.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A transportable apparatus for testing a tooth flank profile and a tooth flank lines (tooth angle) of stationary gear wheels, in particular gear wheels of larger diameter, on gear machines or tooth flank grinding machines, as well as for positioning said apparatus by an orientation sensor and for orienting a measuring scanner at the gear teeth for the testing operation, comprising an apparatus frame, adjusting means on said frame for leveling said frame, means for aligning said frame at a correct angle with respect to the gear teeth of a stationary gear wheel to be tested, a first carriage mounted on said frame and movable on said frame at a tangent to the gear wheel, a second carriage driven by a motor means movable at right angles to said first carriage toward and away from the gear wheel, a third carriage displaceably supported on said second carriage and in a limitable manner movable parallel with a line of movement of said second carriage against end stops and movable counter to a spring force acting in a direction toward said gear wheel, said orientation sensor mountable on and movable by said third carriage, said orientation sensor comprising a ball at one end having a diameter corresponding to the gear wheel modulus and movable into various tooth gaps for ascertaining an apparatus center position by means of signals directed to and stored in a computer connected to the apparatus, first and second incremental travel transducers operative in tangential and radial directions for transmitting the tangential and radial position of the orientation sensor as signals directed to said computer, said third carriage moving relative to said second incremental travel transducer fixed on said first carriage for the radial position, said orientation sensor being carried by said third carriage during the ascertainment of said apparatus center position determined by a center point of said ball;

said measuring scanner being mountable on said third carriage in place of said orientation sensor in a corresponding relationship to said apparatus center position after the ascertainment thereof of the apparatus center position and removal of said orientation sensor for testing the flank line shape of said gear teeth wherein during said testing the center position of said apparatus is maintained and the third carriage is held without displacement on the second carriage against said end stops by said spring force, and the movement of said measuring scanner being controllable by signals from said computer directed to said motor means in accordance with signals received from said incremental travel transducers for measuring the tooth profile of each of the teeth of said gear wheel.

2. An apparatus as defined by claim 1, characterized in that the first carriage is movable in a controlled-manner by a control motor.

3. An apparatus as defined by claim 2, characterized in that the orientation sensor on the third carriage is movable via a spring package transversely to the direction of movement of the third carriage, and the movement of said orientation sensor in this manner is transmittable to a computer via a transducer.

4. An apparatus as defined by claim 1, characterized in that the first carriage is displaceable relative to the apparatus frame between springs disposed upon the first carriage at opposite ends thereof.

5. An apparatus as defined by claim 4, characterized in that the second carriage is clampable to the first carriage.

6. An apparatus as defined by claim 1, wherein the displaceability of the third carriage relative to the second carriage under the spring force in the direction toward the gear wheel is limited by means of at least one stop between the second and third carriages.

7. An apparatus as defined by claim 2, wherein the displaceability of the third carriage relative to the second carriage under a spring force in the direction toward the gear wheel is limited by means of at least one stop between the second and third carriages.

8. An apparatus as defined by claim 3, wherein the displaceability of the third carriage relative to the second carriage under a spring force in the direction toward the gear wheel is limited by means of at least one stop between the second and third carriages.

9. An apparatus as defined by claim 4, wherein the displaceability of the third carriage relative to the second carriage under a spring force in the direction toward the gear wheel is limited by means of at least one stop between the second and third carriages.

10. An apparatus as defined by claim 5, wherein the displaceability of the third carriage relative to the second carriage under a spring force in the direction toward the gear wheel is limited by means of at least one stop between the second and third carriages.

11. A method for testing a tooth flank profile and tooth flank lines (tooth angle) of gear wheels which comprises:

mounting and leveling a frame of a measuring apparatus on a workpiece table juxtaposed a gear wheel, adjusting a first carriage tangentially rlative to said gear wheel and said frame, detecting the position of said first carriage relative to said frame and sendibng a corresponding signal to a computer, adjusting a second carriage relative to said first carriage toward said gear wheel, securing a third carriage on said second carriage and directing said third carriage toward said gear wheel by a spring force, securing an orientation sensor on said third carriage on an end of said third carriage toward said gear wheel with a ball end of said sensor toward said gear wheel, aligning a center point of said ball of said orientation sensor accurately with respect to an axis of rotation of said gear wheel, adjusting a computer to zero output in accordance with the position of said first carriage, said third carriage and said orientation sensor relative to position transducers, respectively;

determining a zero-point angle for different adjacent teeth of said gear wheel and storing the zero-point angle value for each different tooth in the computer, selecting the zero-point value with the least deviation for a measuring operation, substituting a measuring scanner for said orientation sensor and placing a ball-end of said measuring scanner at the identical point of the ball-end of said orientation sensor, and testing the shape of the teeth of the gear wheel by moving the ball of the measuring sensor along the tooth flanks whereby the computer will provide a printout of the deviations, if any, of the gear teeth as determined by the transducer related to said measuring scanner.

* * * * *